United States Patent [19]

Tesson

[11] 4,182,839

[45] Jan. 8, 1980

[54] PROCESS FOR THE PREPARATION OF CATIONICALLY MODIFIED FORMALDEHYDE RESINS OF PROLONGED STABILITY

[75] Inventor: Gerard Tesson, Auzouer en Touraine, France

[73] Assignee: Manufacture de Produits Chimiques Protex Societe Anonyme, Paris, France

[21] Appl. No.: 921,008

[22] Filed: Jun. 30, 1978

Related U.S. Application Data

[63] Continuation of Ser. No. 600,906, Jul. 31, 1975, abandoned.

[30] Foreign Application Priority Data

Jul. 31, 1974 [FR] France .................................. 74 27207

[51] Int. Cl.$^2$ ............................................. C08G 12/32
[52] U.S. Cl. .............................. 528/254; 260/29.4 R; 528/266; 528/269
[58] Field of Search ..................... 260/67.6 R, 29.4 R, 260/72 R; 528/254

[56] References Cited

U.S. PATENT DOCUMENTS

| | | | |
|---|---|---|---|
| 3,317,630 | 5/1967 | Yuille ............................... | 260/67.6 X |
| 3,721,651 | 3/1973 | Yates ............................... | 260/67.6 X |

FOREIGN PATENT DOCUMENTS 630618 10/1949 United Kingdom .
832203 4/1960 United Kingdom .
1012319 12/1965 United Kingdom .

*Primary Examiner*—Theodore E. Pertilla
*Attorney, Agent, or Firm*—Karl F. Ross

[57] ABSTRACT

Cationic resins soluble in water and stable in solution, based upon melamine and formaldehyde, primary or secondary aliphatic amines, alkanolamines or a polyamine are prepared by reacting melamine with formaldehyde in a methylolation reaction in methanol in the presence of one or more of the aforementioned amines by heating for a period of fifteen minutes to two hours at an alkaline pH of 7.5 to 10 at a temperature of 60° to 85° C. The methylation-condensation reaction which follows is carried out at a pH of 5 to 6, preferably 5.4 to 5.7 until a viscosity is obtained which has a minimum of seventeen seconds measured at 20° C. by an AFNOR No. 6 consistometric head. The methylation reaction is then terminated by the addition of aqueous formaldehyde and condensation is carried out for thirty minutes to two hours at 60° to 90° C. and a pH of 5.5 to 7, preferably a pH of 6 to 6.5. The product has longterm stability and can be used as a water-resisting or humidity-resistant coating or sizing for paper or as an adhesion promoting coating for solid supports to which a varnish is to be applied.

1 Claim, No Drawings

PROCESS FOR THE PREPARATION OF CATIONICALLY MODIFIED FORMALDEHYDE RESINS OF PROLONGED STABILITY

This is a continuation of application Ser. No. 600,906, filed July 31, 1975, now abandoned.

The present invention relates to a process for preparing water-soluble stable cationic resins of a melamine, formaldehyde, primary or secondary amine, alkanolamine or polyamine base. The invention also relates to the resins obtained by this process and to the application of the product.

The new resins prepared according to the present invention are principally intended to improve the humidity resistance of paper and they have also been found to be particularly desirable as adhesion-promoting agents for varnish or other coatings applied to protect solid supports.

Among the numerous hydrophilic synthetic resins utilized to improve the resistance to moisture of paper, melamine-formaldehyde resins have already been placed among the best because they provide certain excellent properties, namely, permanance of treatment over long periods of storage of the paper, speed of baking on the machine, excellent resistance to humidity of the paper treated and rapid recovery upon breakage. The problem, however, with such resins is that the solutions thereof cannot be stored for long periods and this problem has constituted a limitation to further development of the use of such resins as moisture-resisting agents for paper and the like.

Originally, the user was himself required to prepare a colloidal composition of melamine resin and it had been found that even when preparation of the colloidal melamine resin system was carried out under very precise conditions, in a solution containing an aqueous dilute system of melamine and formaldehyde in the presence of hydrochloric acid, that the resulting bath had poor stability, nonuniformity and was not reproducible. All of these problems created difficulties with use of the product.

A significant step was taken when it was recognized that melamine-formaldehyde resins, condensed in the presence of amines gave paper excellent resistance to humidity. The system was easier to use than the colloidal suspension of melamine and formaldehyde although the system did create significant problems with respect to reproducibility. Thus, when two solutions were prepared successively with melamine-formaldehyde-triethanolamine, the preparations being carried out with scrupulously identical conditions, one of the solutions could be stored for fifteen days while the other had a storage life of about two months. In other words, it was impossible to determine, after a period of storage, whether the solution would still be useful. This constituted a significant disadvantage of the system with respect to industrial exploitation of the resin.

It is the principal object of the present invention to provide an improved system whereby the aforementioned disadvantages can be avoided.

Another object of this invention is to provide an improved method of making melamine-formaldehyde resins which are stable in solution for long periods.

Still another object of the invention is to provide improved resin compositions for the treatment of paper in order to improve the moisture-resistance thereof or for the treatment of solid supports in order to improve the adhesion of varnishes and the like.

It is also an object of the invention to provide an improved method of treating paper and/or solid supports to improve moisture resistance and/or adhesion.

I have now found that these objects can be attained, based upon the discovery that a partial methylation of the methylol groups of a melamine formaldehyde resin rendered cationic by condensation with an aliphatic primary or secondary amine, an alkanolamine, a polyamine or their salts, permits the storage of the resin in solution for periods greater than one year and in addition provides a composition having the ability to impart excellent humidity resistance to the paper treated with it.

According to the present invention, the resin solution is prepared by the steps of:

(a) Carrying out a methylolation reaction of melamine with formaldehyde in a methanol solution and in the presence of one or more of the aforementioned amines by heating the solution to a temperature of 60° to 85° C. for fifteen minutes to two hours at an alkaline pH of 7.5 to 10;

(b) Carrying out a methylation-condensation reaction with the solution resulting from step (a) at a pH of 5-6, preferably 5.4 to 5.7, until a minimum viscosity of 17 seconds is obtained, as measured at 20° C. with a consistometric head of the AFNOR No. 6 type; and (c) Terminating the methylation reaction by the addition of aqueous formaldehyde and continuing the condensation for a period of thirty minutes to two hours at 60° C. to 90° C. at a pH of 5.5 to 7, preferably a pH of 6 to 6.5.

It has been found to be convenient to effect only a partial methylation of the methylol groups of the resin in order to retain, to a significant extent, the good reactivity of the latter.

According to another feature of the invention, the methylation reaction (step b) is followed during the course of the reaction by infrared spectrography of samples of the reaction system. The characteristic absorption band of the methoxy group is about 1080 $cm^{-1}$ as the methoxy group is formed during condensation in an acid phase and in the presence of melamine and formaldehyde in a methanol solution containing a salt of an amine, alkanolamine, or a polyamine. When the desired methylation level is obtained, it is desirable to add a quantity of formaldehyde, in the form of an aqueous solution, to carry out the desired condensation.

It is indeed surprising to note that a very slight methylation is all that is required and that methylation can be carried out until a peak is discovered in the absorption curve of infrared spectrography at the frequency of 1080 $cm^{-1}$, this being sufficient to yield a resin of good stability and having excellent reactivity.

Simultaneously with the methylation reaction in the acid medium there occurs a condensation of the methylol groups of the melamine among themselves or with the hydrogens of the amines of melamine and the amines (primary, secondary, alkanolamines or polyamines) introduced into the system. A condensation of the methylol groups of melamine with those of trialkanolamine also can occur. This condensation is characterized by an increase in the viscosity in the course of the reaction.

The molar ratio of formaldehyde to melamine during the methylation step should be between 3 and 9, preferably about 6. After the methylation-condensation reaction it is preferable to add an excess of formaldehyde in the form of an aqueous solution. In practice it has been found that there is no theoretical limit to the molar ratio of formaldehyde to melamine which should be supplied in this step but it has been found to be useless to exceed a ratio of 25.

It has been found to be advantageous to provide 0.1 to 2.5, preferably 0.5 to 2, moles of an aliphatic primary amine or an aliphatic secondary amine, of an alkanol amine or of a polyamine, or a combination thereof, per mole of melamine.

It has been found to be totally unimportant whether one or more of these amines are used or the amine is utilized in the form of its mineral acid or organic salt. The preferred salts are the hydrogen chloride, acetic acid, formic acid and the like. The salts and amines can be used individually or in a mixture.

As the aliphatic primary or secondary amine, one should use preferably a compound of the formula $R_1-NH_2$ or

in which $R_1$ and $R_2$ are identical or different and each represents a lower alkyl group containing 1 to 4 carbon atoms.

Best results have been found with methylamine, dimethylamine, ethylamine, diethylamine, propylamine, isopropylamine, dipropylamine, butylamine.

The alkanolamines which are utilized according to the invention have the formula:

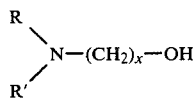

in which $x=1$ to 4, and R and R' are identical or different, each representing hydrogen, an alkyl group or alkanol of 1 to 4 carbon atoms. In this case as well, the alkyl is lower alkyl and the preferred alkanolamines are monoethanolamine, diethanolamine, propanolamine, diethylethanolamine, triethanolamine.

The polyamines which can be utilized according to the invention have the formula:

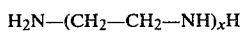

with $x=1$ to 5, such as ethylenediamine, diethylenetriamine, triethylenetetramine, tetramethylpentamine.

The modified melamine formaldehyde resin according to the invention, which is water soluble, is of course prepared by the reaction of melamine with formaldehyde in methanol in the presence of the aforementioned amines, alkanolamines and polyamines utilized separately or in admixture. The methylolation reaction is, as noted, carried out in an alkaline medium at a pH of 7.5 to 10 by the addition of the amine and readjustment of the pH by means of a mineral or organic acid, at a temperature between 60° and 85° C. and generally with reflexing of the methanol. The methylation time should vary with temperature but in all cases lies between fifteen minutes to two hours.

The methylation-condensation reaction is then carried out upon the reaction system previously prepared by acidifying it to a pH of 5 to 6, preferably to a pH of 5.5 to 5.8 within a mineral acid or an organic acid, preferably hydrochloric acid. In the stage the reaction stage is heated to 70° to 90° C. The reaction is terminated when the measured viscosity at 20° C. using an AFNOR No. 6 consistometric head reaches a minimum of 17 seconds and preferably lies in the range of 20 to 100 seconds.

The methylation-condensation reaction can also be followed spectographically as noted using an infrared spectrometer and is terminated when a peak in the absorption curve is obtained at about 1080 cm$^{-1}$, which is characteristic of the methoxy group. Thereupon the methylation reaction is terminated by the addition of aqueous formaldehyde and condensation of the melamine with the formaldehyde is carried out for 30 minutes to two hours at 60° to 90° C. and a pH of 5.5 to 7 and preferably pH 6 to 6.5. The solution is then cooled to 20° C. The cationic melamine-formaldehyde resin thus obtained is totally soluble in water and possesses a stability to storage such that it can be stored for periods greater than one year at 20° C. without modification or loss of ability to treat paper.

SPECIFIC EXAMPLES

Unless otherwise indicated, all percents are by weight.

EXAMPLE I

A reaction mixture of 756 grams of melamine, 2130 grams of formaldehyde (40% in methanol), 672 grams of triethanolamine and 96 grams of hydrochloric acid (36%) to adjust the pH to 8 is heated with refluxing at 80° C. for a period of 25 minutes. The pH is then adjusted to 5.7 with 390 grams of hydrochloric acid (36%) and the reaction mixture is heated to 85° C. for a period of 45 minutes until a viscosity is obtained of 25 seconds using an AFNOR No. 6 head measured at 20° C.

4860 grams of formaldehyde (aqueous 37%) is then added and the pH is adjusted to 6.1 with 20 grams of triethanolamine. The reaction mixture is heated for 45 minutes with refluxing. The reaction mixture is then cooled to 20° C. The cationic syrup thus obtained is completely soluble in water and contains 37.6% dried solids. It is stable for a period of one year and a half at 20° C.

EXAMPLE II

To 326 grams of formaldehyde (36%) in methanol one adds 126 grams of melamine. 30 grams of ethylenediamine is added and the reaction mixture is heated for thirty minutes at 80° C. 27 milliliters of hydrochloric acid (36%) is then added to adjust the pH to 5.5. The reaction mixture is then heated for one hour with refluxing until, by monitoring by infrared spectrography, a peak is obtained at 1080 cm$^{-1}$. 810 grams of formaldehyde (37% water) is then added and the pH is readjusted to 6.2 with one milliliter of ethylenediamine. The reaction mixture is then heated for 45 minutes with refluxing. The cationic resin syrup thus obtained is completely soluble in water and contains 38.6% dry solids. It has a stability on storage at 20° C. of greater than one year.

EXAMPLE III

This Example relates to a test of the improvement of the resistance of paper to a humid conditions. The test is carried out with a paste dispersion of paste of 87% alphacellulose refined to 27° Schopper.

The resin syrup obtained according to the previous Examples (Example I or Example II) is added to a suspension of the paste (1.5%) in water. A ratio of 1% (dry) with respect to the weight of dry fiber. The pH is adjusted to 5 with an acetic acid solution (10%). Sample sheets are drawn from the product for laboratory testing. The test samples are pressed to dryness for a period of two minutes at 150° C. The physical tests are carried out according to the AFNOR standards in a laboratory conditioned to a temperature of 20° C. and 65% relative humidity. The results of these tests are given in the table below.

|  | Duration to Rupture | | Bursting Index | |
| --- | --- | --- | --- | --- |
|  | Dry | Moist | Dry | Moist |
| Resin of Example I | 203 | 46 | 12.6 | 9.35 |
| Resin of Example II | 198 | 38 | 12.4 | 8.4 |
| Commercial Resin | 187 | 30.6 | 12.2 | 6.3 |

EXAMPLE IV

A humid pellicle of regenerated cellulose is immersed in a bath to test improved adhesivity containing 6% glycerol and 0.25 and 0.5% of the resin expressed as dry material of Example I. The regenerated cellulose is obtained by acid coagulation of the cellulose xanthate.

After drying, to a water level of 6 to 12% there is applied to this support a layer of nitrocellulosic varnish to a thickness of one micron. After drying for one hour in air and another three minutes at 95° C., the adhesion of the varnish to the dry support is tested as is the adhesion in a humid atmosphere of 95% relative humidity. The tests are made by measuring the tear resistance expressed in grams per centimeter of the size of the test specimen. The results are given in the table below:

| Concentration of Resin in the | Resistance to Tearing | |
| --- | --- | --- |
| Adhesion Promoting Bath | Dry | Moist |
| 0.25% | 257 | 92 |
| 0.5% | 310 | 162 |

The tests demonstrate that the resistance to adhesion of a coating material to a support is increased by application of a solution of the resin according to the invention. In tests applying the resin to paper, the resistance of the paper to humid environments was noted.

I claim:
1. A process for the preparation of a cationic resin soluble in water and stable in solution which comprises the steps of:
   (a) methylolating melamine with formaldehyde in methanol in contact with at least one compound selected from the group which consists of primary and secondary aliphatic amines, alkanolamines, polyamines and salts thereof for a period of 15 minutes to two hours at a temperature of 60° to 85° C. and an alkaline pH of 7.5 to 10;
   (b) thereafter carrying out a methylation-condensation reaction with the reaction product of step (a) at a pH of 5 to 6 to obtain a minimum viscosity of 17 seconds at 20° C. by a consistometric head AFNOR No. 6; and
   (c) thereafter terminating the methylation reaction with the viscosity between a minimum of 17 seconds and up to 100 seconds and condensing the formaldehyde thus added with the reaction system of step (b) for a period of thirty minutes to two hours at a temperature of 60° to 90° C. and at a pH of 5.5 to 7.

* * * * *